No. 820,482. PATENTED MAY 15, 1906.
L. DION.
APPARATUS FOR TREATING LIQUIDS.
APPLICATION FILED MAY 24, 1904.
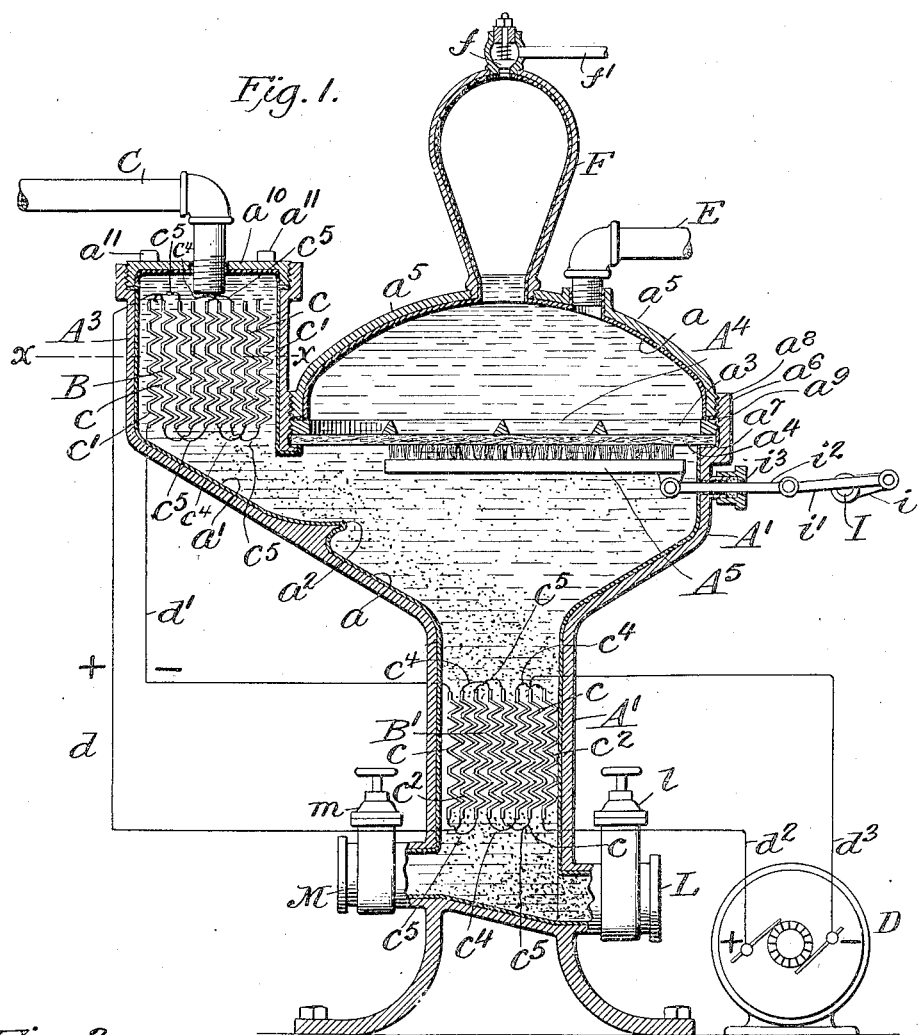

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

APPARATUS FOR TREATING LIQUIDS.

No. 820,482.   Specification of Letters Patent.   Patented May 15, 1906.

Application filed May 24, 1904. Serial No. 209,557.

*To all whom it may concern:*

Be it known that I, LÉON DION, a citizen of the United States, and a resident of the borough of Manhattan, in the city, county, and State of New York, have invented certain new and useful improvements in apparatus for treating liquids whereby to recover the metals and other substances contained in them and to purify the liquids, of which the following is a specification.

My invention relates to that class of apparatus in which the liquids during their treatment are subjected to the action of an electric current, and is especially adapted to the treatment of waters obtained from mine and mineral springs, whereby to not only recover the metals and other substances contained in them, but likewise purify the waters and render them potable and suitable for culinary and other uses, the object of the invention being to provide an apparatus of this class which while simple in construction shall at the same time more thoroughly and efficiently recover the metals and other substances contained in the liquids and purify the latter than has been possible with the apparatus heretofore in use.

To these ends the invention consists in certain peculiarities of construction and combinations of parts, all as will hereinafter more fully appear.

Referring to the accompanying drawings, which form a part of this specification, Figure 1 is a side elevation, partly in section, of an apparatus constructed in accordance with my invention; Fig. 2, a horizontal transverse section taken in the plane $xx$ of Fig. 1 looking downward, and Fig. 3 a side elevation of a portion of one of the electrodes.

In all the figures like letters of reference are employed to designate corresponding parts.

A indicates a vessel or reservoir for receiving the liquids to be treated, the same being preferably constructed with a contracted lower body portion A', an enlarged globular portion $A^2$, and a contracted upwardly-extending chamber portion $A^3$, with the entire interior of the several portions thereof provided with a vitreous or other insulating lining $a$ applied thereto.

B and B' indicate two groups of electrodes, through which an electric current may be applied to the liquids. These electrodes may be constructed in various forms. In the embodiment of the invention which I have selected for purposes of illustration, however, they are constructed of corrugated plates of any appropriate material, of which the members of the positive or + series $c$ of each group are disposed in parallel relationship to one another and secured at one of their edges to a suitable base-plate $c'$, while the members of the negative or − series $c^2$ of each group are similarly arranged in a like relationship and secured to an oppositely-disposed corresponding base-plate $c^3$. As thus secured to their respective base-plates these electrodes are respectively disposed within the upwardly-extending chamber portion $A^3$ and in the lower contracted body portion A', with the members of the positive series $c$ of each group extending between and alternating with the members of the negative series $c^2$, but without contacting with them or the members of either series extending sufficiently far across to contact with the base-plate of the other. In this relationship the electrodes are secured in place by screws or bolts extending through their respective base-plates and engaging with suitable holes respectively formed in the walls of the upwardly-extending chamber portion $A^3$ and in the walls of the lower contracted body portion A' or otherwise. The groups of electrodes B and B' being thus respectively secured within the upwardly-extending chamber portion $A^3$ of the vessel or reservoir A and within the lower contracted body portion thereof, the series of positive electrodes $c$ of each group are connected by appropriate conductors $c^4$, while the series of negative electrodes $c^2$ of each group are similarly connected by conductors $c^5$, with both the positive and negative series $c$ and $c'$, respectively, connected with any convenient source of electric supply—as, for instance, with a dynamo D. In some instances these groups of electrodes may be connected with the source of electric supply in multiple circuit, in which cases the positive and negative poles of each group of electrodes will be separately connected with the respective positive and negative poles or elements of the electric generator or other source of electric supply independently of the others. In the drawings, however, I have shown the two groups B and B' of electrodes connected with the source of electric supply in a serial circuit, the positive and negative series of electrodes $c$ and $c^2$ of the group B being, respectively, connected with the positive and negative series of the group of electrodes B' through the intermediary of conductors $d$ and $d'$ extending between them, with the positive and negative electrodes of the group B' in turn connected with the positive and negative poles or elements of the dynamo D or other source of electric supply through the medium of the conductors $d^2$ and $d^3$.

With the parts constructed and arranged as above explained the metal or other substances separated out from the liquid by the action of the electric current supplied through the group of electrodes B in traveling downward from them by the action of their gravity would move downward along the interior surface of the inclined portion $a'$ of the vessel or reservoir A in close relationship thereto and would pass between only a few of the electrodes of the group B' on that side unless some provision was made for forcing them outwardly from that inclined surface, whereby to cause them to so distribute themselves below that they will pass between all of the electrodes of the group B'. In order, therefore, to provide for this deflection of the particles of metal or other substances outward over the upper end of all of the electrodes of the group B', I provide the interior of the inclined portion $a'$ with a deflector $a^2$, which extends inward therefrom, as shown in Fig. 1. By this means, as will be seen, the equal distribution of the particles of metal or other substances falling downward from the group of electrodes B over the group of electrodes B' will be insured, and in order to provide for the contact of the liquid to be treated with the electrodes of the group B as it passes between them, as well as the contact of the particles of metal or other substances with the electrodes of the group B' as they pass between them, the corrugations $b$ of the respective electrodes of the groups B and B' will be so disposed as to extend transversely across the path of the liquid and the particles of metal or other substances separated out from it, whereby to form sinuous passages between them. In some instances the corrugations $b$ may extend in parallel straight lines across the face of the electrodes. In others they may be formed in the shape of broken or indented lines and in that shape extend transversely across them, and either of these forms may be adopted, as may be preferred, and the apparatus operate with equal efficiency.

With the electrodes thus disposed within the contracted body portion of the vessel or reservoir A and the upwardly-extending chamber portion $A^3$ the upper enlarged globular portion $A^2$ of the latter is provided with a suitable filter $A^4$. This filter, which may be constructed in any approved form, is here shown as composed of a suitable frame $a^3$, with a layer or layers of felt $a^4$ or other appropriate filtering material secured to or supported upon its under side, and is arranged centrally within the upper enlarged globular portion of the vessel or reservoir above, in transverse relationship to the lower contracted body portion $A'$. To permit of this arrangement being effected, the upper enlarged globular portion $A^2$ is constructed with a removable top $a^5$, with the bottom portion $a^6$ counterbored for a small distance, whereby to form a shoulder or ledge $a^7$. Upon the shoulder or ledge thus formed the filter $A^4$ rests and may be firmly clamped by the removable top $a^5$, which is provided around its outer lower edge with a screw-thread $a^8$, that engages with a corresponding female screw-thread $a^9$, formed in the interior of the counterbored upper end of the bottom portion $a^6$. By this means, as will be seen, not only is the filter firmly clamped in place when arranged in operative relationship, but the removal of the same and access to it afforded when desired. The upper enlarged globular portion $A^2$ being thus equipped with the filter $A^4$ is also provided with a discharge-pipe E, by means of which the liquid passing through the filter may be discharged, and with a chamber F, which in turn is provided in its top with a pressure-valve $f$ and with a discharge-pipe $f'$, leading from it, whereby any gases set free by the action of the current in passing through the liquid may be accumulated and when the pressure within the chamber exceeds a certain limit pass off through the valve and pipe and be thereby discharged. With the filter arranged as above explained may be employed a brush or other cleaner $A^5$, by means of which any particles of metal or other substances adhering to its under side may be removed and the filter thereby protected from obstruction. This brush, which is preferably disposed beneath the filter, may in some instances be arranged to slide back and forth in suitable guideways secured at its ends. In the drawings, however, I have shown it as constructed of a specific gravity sufficiently light to permit of its being held upward in contact with the under surface of the filter by its own buoyancy, and either of these forms of construction may be adopted, as preferred. The brush or other cleaner $A^5$ being thus supported in either of the ways specified may be reciprocated back and forth beneath the filter $A^4$ by any appropriate means. I prefer, however, to impart this reciprocating movement thereto from a shaft I through the intermediaries of a crank $i$ and a connecting-rod $i'$, the latter of which is jointed at one of its ends to the wrist-pin of the crank and at its other to the outer end of a rod $i^2$, fitted to slide through an appropriate stuffing-box $i^3$ and jointed at its inner end to the brush $A^5$, as shown. While the upper enlarged globular portion of the vessel or reservoir A is thus provided, the lower end of the contracted body portion A', which extends some distance below the group of electrodes B'; is inclined downward toward one of its sides and the side toward which it thus inclines provided with a discharge-pipe L, through which any metal or other material deposited in the lower portion of the vessel or reservoir may be removed, with such discharge-pipe provided with a suitable gate $l$, whereby the passage through the pipe may be opened or closed, as may be desired, As thus equipped the lower portion of this contracted body portion A' of the vessel or reservoir is likewise provided with a hand-hole M, through which access to the interior of the vessel or reservoir may be had when required, the same being preferably constructed in the form of a short projecting pipe and provided with a suitable gate $m$, through which the opening and closing of this hand-hole may be effected when desired. In like manner to afford access to the electrodes B, as well as to the interior of the vessel or reservoir A when desired I find it convenient to construct the upwardly-extending chamber portion $A^3$ with a detachable cover $a^{10}$, which is preferably held in place when adjusted by suitable screws $a^{11}$ and receives the end of a pipe C, through which the liquid to be treated by the apparatus may be supplied.

With an apparatus constructed as above described and with an electric current supplied to the electrodes through a proper circuit the operation of the apparatus is as follows: The liquid to be treated will be delivered into the top of the upwardly-extending chamber portion $A^3$ through the pipe C and passing downward between the electrodes of the group B will be charged with electricity. As thus charged the metal or other substances contained in the liquid will be separated out therefrom and in its or their free state will under the action of gravity fall downward between the electrodes B', where it or they, with the liquid in which it or they are contained, will be subjected to a further electric current, the consequence of which will be that the cohesive or other attractive forces possessed by the particles thus set free will be caused to act with greater intensity, and thereby draw together these particles and aggregate them into masses of larger magnitude, which by the continued action of gravity will be deposited in the lower portion of the lower contracted portion of the vessel or reservoir A. With the liquid thus freed from the metal or other substances and purified it will rise in the vessel or reservoir A and passing upward through the filter $A^4$, where it will part with any floating particles held in mechanical suspension therein, will flow onto and through the discharge-pipe E, where it will be discharged. The operation thus initiated will be continued as long as desired and the removal of the metal or other substances in the bottom of the vessel or reservoir accomplished from time to time through the discharge-pipe L by opening the gate $l$ therein, when it will pass outward through the pipe into an appropriate receptacle arranged to receive it or otherwise. The metal or other substance having been thus removed from the lower end of the lower contracted portion A', the gate $l$ will be closed until the accumulation of metal or other substances in the lower end of the lower contracted portion becomes sufficiently great, when the metal or other substances may be again removed, as before explained, and so on indefinitely, the liquid after having been treated being discharged in a thoroughly purified and filtered condition. Should the metal or other substances contained in the lower end of the lower contracted portion of the vessel or reservoir A fail to discharge itself through the tube L when the gate $l$ therein is opened, it may be forced outward therethrough by the hand of the operator or some implement thrust inward through the hand-hole M, which may be permitted when it is desired by simply opening the gate $m$, arranged therein.

While in the drawings I have shown the requisite current supplied from an ordinary dynamo, I wish it distinctly understood that I do not limit myself thereto, as it is obvious that I may employ any other form of generator and may avail of either frictional, voltaic, or other forms of current, as may be preferred or found the most convenient.

With the interior of the vessel or reservoir A and the interior of the pipes L and M coated with an insulated lining it is to be understood that in practice the pipes C, E, and $f'$, the filter $A^4$, the chamber F, and the rod $i^2$ will be insulated at the points where they enter or come in contact with the vessel or reservoir, as shown.

Having now described my invention and specified certain of the ways in which it is or may be carried into effect, I claim and desire to secure by Letters Patent of the United States—

1. The combination, with a vessel or reservoir constructed with a contracted lower body portion A', an upper globular portion $A^2$ and with a contracted chamber portion $A^3$ near its top, a group of coöperating positive and negative electrodes arranged within the contracted chamber portion $A^3$, and means for supplying an electric current to the electrodes, of means through which the liquid to be treated may be supplied to the vessel or reservoir in contact with the electrodes and caused to pass between them, and a compartment into which the material separated out from the liquid may descend, substantially as described.

2. The combination, with a vessel or reservoir constructed with a contracted lower body portion, an enlarged upper portion, and with a contracted chamber portion above the contracted body portion, a group of coöperating positive and negative electrodes arranged within the said contracted chamber portion, and means for supplying an electric current to the electrodes, of means through which the liquid to be treated may be supplied to the vessel or reservoir in contact with the electrodes and caused to pass between them, a compartment into which the materials separated out from the liquid may descend, a filter arranged across the enlarged upper portion of the vessel or reservoir, and means for conducting the purified and filtered liquid away from the apparatus extending from the enlarged upper portion of the vessel or reservoir above the filter, substantially as described.

3. The combination, with a vessel or reservoir constructed with a contracted lower body portion, an enlarged upper portion and with a contracted chamber portion above the contracted body portion, a group of coöperating positive and negative electrodes arranged within said contracted chamber portion, and means for supplying an electric current to the electrodes, of means through which the liquid to be treated may be supplied to the vessel or reservoir in contact with the electrodes and caused to pass between them, a compartment into which the materials separated out from the liquid may descend, a filter arranged across the enlarged upper portion of the vessel or reservoir, means for conducting the purified and filtered liquid away from the apparatus extending from the enlarged upper portion of the vessel or reservoir above the filter, and mechanism by which the cleaning of the filter may be effected, substantially as described.

4. The combination, with a vessel or reservoir constructed with a contracted lower body portion, an upper portion and with a contracted chamber portion above the contracted body portion, a group of coöperating positive and negative electrodes arranged within said contracted chamber portion, and means for supplying an electric current to the electrodes, of means through which the liquid to be treated may be supplied to the vessel or reservoir in contact with the electrodes and caused to pass between them, and a chamber located upon the vessel or reservoir and communicating with its interior for receiving the gas or gases set free by the action of the electric current in passing through the liquid, substantially as described.

5. The combination, with a vessel or reservoir constructed with a lower main body portion $A'$, an upper enlarged portion $A^2$ and a contracted chamber portion $A^3$ above said lower main body portion, a group of coöperating positive and negative electrodes arranged within the contracted chamber portion, and means for supplying an electric current to the electrodes, of means through which the liquid to be treated may be supplied to the vessel or reservoir in contact with the electrodes and caused to pass between them, a chamber located upon the upper enlarged portion of the vessel or reservoir and communicating with its interior for receiving the gas or gases set free by the action of the electric current in passing through the liquid, a discharge-pipe, and a pressure-valve located upon the gas-receiving chamber, substantially as described.

6. The combination, with a reservoir or receptacle, of a group of positive and negative electrodes constructed in the form of corrugated plates, with the members of the positive electrodes arranged between and alternating with the negative electrodes, whereby a sinuous passage-way is formed between them, and means through which the liquid to be treated may be supplied to such reservoir or receptacle, and, after passing between the members of the electrodes, discharged from the reservoir or receptacle, substantially as described.

7. The combination, with a vessel or reservoir constructed with a contracted lower body portion and with a contracted chamber portion above its lower contracted body portion, a coöperating group of positive and negative electrodes arranged within the contracted chamber portion, and means through which the liquid to be treated may be supplied to the vessel or reservoir above the electrodes and caused to flow down between such electrodes, of a second group of coöperating positive and negative electrodes arranged within the contracted body portion of the vessel or reservoir, and means for supplying an electric current to both groups of electrodes, whereby the materials separated out from the liquid undergoing treatment by the first group of electrodes is acted upon by the second group of electrodes, substantially as described.

8. The combination, with a vessel or reservoir, a group of coöperating positive and negative electrodes arranged within its upper portion, and means through which the liquid to be treated may be supplied to such vessel or reservoir above the electrodes and caused to pass down between them, of a second group of coöperating positive and negative electrodes arranged within the lower portion of the vessel or reservoir for acting upon the materials separated out from the liquid by the first-mentioned electrodes, means for supplying an electric current to both groups of electrodes, and means through which the purified liquid may be discharged from the vessel or reservoir, substantially as described.

In witness whereof I have hereunto set my hand this 29th day of January, 1904.

LÉON DION.

Witnesses:
N. G. DOUGLASS,
R. F. SWEENY.